United States Patent
Abbasi

(10) Patent No.: US 7,117,019 B2
(45) Date of Patent: Oct. 3, 2006

(54) DISPLAY AND KEYPAD BACKLIGHT MANAGEMENT FOR PORTABLE ELECTRONIC DEVICES

(75) Inventor: Aamir A Abbasi, Mundelein, IL (US)

(73) Assignee: Motorola, Inc., Schaumburg, IL (US)

( * ) Notice: Subject to any disclaimer, the term of this patent is extended or adjusted under 35 U.S.C. 154(b) by 740 days.

(21) Appl. No.: 09/822,653

(22) Filed: Mar. 30, 2001

(65) Prior Publication Data

US 2002/0142808 A1 Oct. 3, 2002

(51) Int. Cl.
 H04B 1/38 (2006.01)
 H04B 1/18 (2006.01)
 H04M 1/00 (2006.01)
(52) U.S. Cl. ............... 455/566; 455/158.4; 455/159.1; 455/574; 345/211; 349/61
(58) Field of Classification Search .............. 455/566, 455/414.1, 67.11, 67.13, 90.1, 90.2, 95, 575.1, 455/574, 550.1, 287, 414.4; 345/156, 102, 345/63, 207, 8, 104, 84, 87
See application file for complete search history.

(56) References Cited

U.S. PATENT DOCUMENTS

| | | | | |
|---|---|---|---|---|
| 4,349,705 A | 9/1982 | Kuhfus | .................. | 179/90 L |
| 4,374,308 A | 2/1983 | Holesha | .................. | 179/99 LS |
| 5,247,700 A * | 9/1993 | Wohl et al. | .............. | 455/552.1 |
| 5,315,695 A | 5/1994 | Saito et al. | .................. | 395/132 |
| 5,384,577 A | 1/1995 | McLaughlin et al. | ........ | 345/102 |
| 5,406,305 A | 4/1995 | Shimomura et al. | ........ | 345/102 |
| 5,548,832 A * | 8/1996 | Karam | .................... | 455/226.4 |
| 5,760,760 A * | 6/1998 | Helms | .................... | 345/102 |
| 5,854,617 A | 12/1998 | Lee et al. | .................... | 345/102 |
| 5,926,119 A | 7/1999 | Lindeman et al. | ............ | 341/22 |
| 5,952,992 A | 9/1999 | Helms | .................... | 345/102 |
| 5,970,419 A | 10/1999 | Terashima et al. | .......... | 455/566 |
| 6,011,961 A | 1/2000 | Kaschke | .................... | 455/90 |
| 6,073,034 A * | 6/2000 | Jacobsen et al. | ............ | 455/566 |
| 6,151,008 A | 11/2000 | Zhang | .................... | 345/102 |
| 6,278,887 B1 * | 8/2001 | Son et al. | .................... | 455/566 |
| 6,687,515 B1 * | 2/2004 | Kosaka | .................... | 455/566 |
| 6,690,351 B1 * | 2/2004 | Wong | .................... | 345/156 |
| 2001/0024967 A1 * | 9/2001 | Bauer | .................... | 455/574 |
| 2001/0027123 A1 * | 10/2001 | Ishigaki | .................... | 455/566 |
| 2003/0065370 A1 * | 4/2003 | Lebel et al. | .................. | 607/60 |
| 2004/0192411 A1 * | 9/2004 | Shim | .................... | 455/574 |

\* cited by examiner

Primary Examiner—Tony T. Nguyen
(74) Attorney, Agent, or Firm—Hisashi D. Watanabe

(57) ABSTRACT

This invention is a portable electronic device (100) including a display (212), an input device (210), a lighting circuit (204), a light sensor (206) and a control circuit (208). The lighting circuit (204) includes a light source (214) to illuminate the display (212) and the input device (210). The light sensor (206) determines the ambient lighting conditions about the display (212) and/or the input device (210) and generates an ambient lighting signal based on the ambient lighting conditions. The control circuit (208) is coupled to the lighting circuit (204) and the light sensor (206) and has a delayed operation mode in which a first activation of the input device (210) illuminates the display (212) without performing any other operation of the device (100) and a second activation of the input device performs an operation of the device other than illuminating the display. The control circuit (208) of the portable electronic device (100) may receive a reverse bias signal generated by the lighting circuit (204) when incident with ambient lighting about the user interface (202) to supplement or eliminate the light sensor (206).

12 Claims, 3 Drawing Sheets

DISPLAY AND KEYPAD BACKLIGHT MANAGEMENT FOR PORTABLE ELECTRONIC DEVICES

FIELD OF THE INVENTION

The present invention relates generally to the field of displays and user interfaces for portable electronic devices. In particular, the present invention relates to a backlighting system for a flat-panel display, a keypad and selection buttons of a portable electronic device that is responsive to the lighting conditions of the environment surrounding the device.

BACKGROUND OF THE INVENTION

A user interface for a portable electronic device includes an input device, such as a keypad, for data input by a user and a flat-panel display for information output to the user. A portable electronic device has an increasing number of features and, as a result, requires more frequent interaction and use of its keypad and display. These features include Internet access, personal organizer functions, entertainment programs, audio player functions (such as MP3 and AM/FM radio), A/V player functions (such as video streaming and video conferencing), calculator functions and a host of other possibilities. As such, the backlighting system for the display and the keypad is activated and remains on for as long as the keypad receives input from the user. When keypad activity is not detected for a particular period of time, such as 15 seconds or so, the backlighting system for display and keypad will deactivate. However, the user has no real need for activating the backlighting system when the ambient lighting conditions are sufficient to view the display and keypad. Thus, in an environment that has sufficient ambient lighting, backlighting becomes a wasteful drain on the battery of the device.

Devices having circuitry for adjusting the luminance of a display based on ambient lighting conditions are known. Such device includes a liquid crystal display, a backlighting source adjacent to the display, and an ambient light sensor coupled to the backlighting source. The backlighting source adjusts the luminance of the liquid crystal display based on the ambient lighting conditions detected by the ambient light sensor. These devices are more energy efficient than systems that turn-on the backlighting source and stay-on for a predetermined time period whenever keypad activity is detected.

Typically, a user has difficulty viewing the display and keypad of the portable electronic device in areas of low lighting or total darkness. In such case, a keystroke is necessary to activate the backlighting system so that the user will be able to read the display and keypad. Unfortunately, the keystroke activates an operation of the device as well as activating the backlighting system. In many cases, the device executes an undesirable operation (such as entering a character on the display), particular since the user could not see the keypad when the keystroke was made. Subsequently, the user must clear the undesired entry in order to continue, thus causing counter-productive keystrokes and wasteful drain on the battery due to these extra keystrokes.

Accordingly, there is a need for a portable electronic device that operates effectively for a user in low lighting or complete darkness. In particular, the device should permit the user to activate a button on its keypad merely to turn-on the backlighting system without performing any other operation of the device. For keystrokes entered soon thereafter, the keypad should operate the device as it normally would when there is more ambient lighting. With such a device, the user would not worry about entering characters or activating functions when he or she cannot see the display. There is also a need for a portable electronic device having a backlighting system that illuminates an input device in addition to, or separate from, a display based on ambient lighting conditions in order conserve energy consumption. There is a further need for a portable electronic device having a backlighting system that detect ambient lighting conditions without requiring a light sensor in order to minimize cost and/or the size of the device. The present invention fulfills these needs and provides other benefits as will be apparent from the description herein.

DETAILED DESCRIPTION OF THE PREFERRED EMBODIMENT

The present invention is a portable electronic device including a display, an input device, a lighting circuit and a control circuit. The lighting circuit includes a light source to illuminate the display, and the control circuit is coupled to the lighting circuit. The control circuit has a delayed operation mode in which a first activation of the input device illuminates the display without performing any other operation of the device and a second activation of the input device performs an operation of the device other than illuminating the display.

The portable electronic device may also include a light sensor, coupled to the control circuit, to determine the ambient lighting conditions about the display and/or the input device, and the light sensor generates an ambient lighting signal based on the ambient lighting conditions. The light source of the lighting circuit is capable of illuminating the input device as well as the display. The control circuit receives the ambient lighting signal from the light sensor and activating the lighting circuit to illuminate the input device based on the ambient lighting signal.

The control circuit of the portable electronic device may receive a reverse bias signal generated by the lighting circuit when incident with ambient lighting about the display. The control circuit then activates the lighting circuit to illuminate the display based on the ambient lighting.

Figure 1:
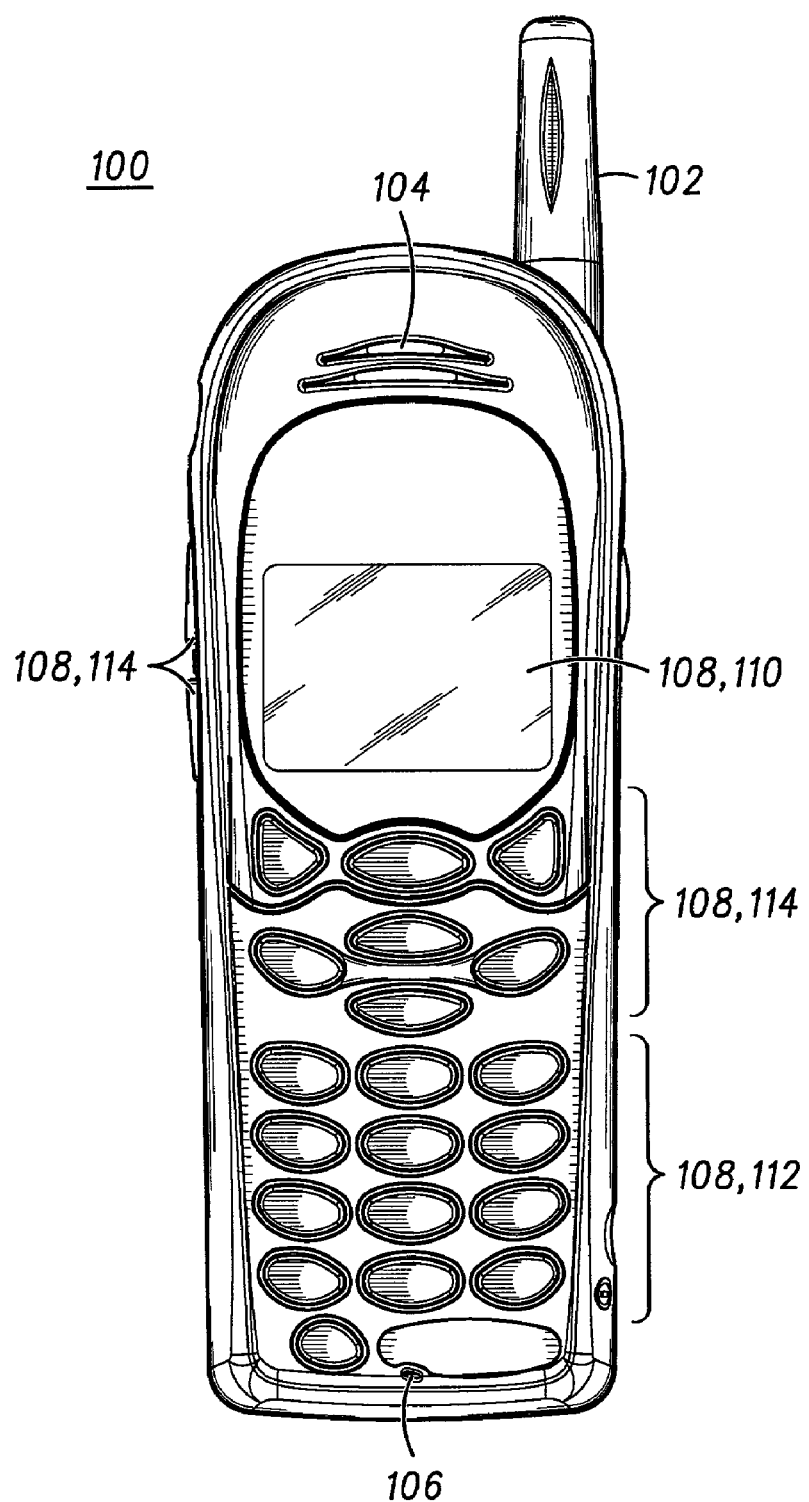
FIG. 1 is a top plan view of a radiotelephone of the present invention.

A portable electronic device that may use, and benefit from, the present invention is generally shown in FIG. 1 to be a radiotelephone 100, such as a cellular telephone operable in a cellular telephone system. Although a radiotelephone 100 is shown in FIGS. 1, one skilled in the art will recognize that the features discussed hereinbelow will also find application in other portable electronic devices that have user interfaces, i.e. displays and/or input devices, such as portable computing devices, cordless telephones, wireline telephones, personal digital assistants, two-way radios, pagers, and the like, and radiotelephones described herein shall refer to each of these and their equivalents.

The radiotelephone 100 includes an antenna 102, speaker apertures 104, a microphone aperture 106, and a user interface 108. The antenna 104 is connected to internal transceiver circuitry for transmitting and receiving information in a wireless communication system. The speaker apertures 104 direct audio information from an internal speaker to a user, and the microphone aperture 106 directs audio information from the user to an internal microphone. The user interface 108 of the radiotelephone 100 interacts with the user and provides output information to, and receives input information from, the user. Accordingly, the user interface 108 includes, but is not limited to, a display 110, a keypad 112 and selection buttons 114. The preferred embodiment, shown in FIG. 1, provides the display 110, the keypad 112 and several selection buttons 114 at the front of the radiotelephone 100. In addition, more selection buttons 114 are provided at the side of the radiotelephone 100. It is to be understood that the present invention may be utilized for a device having more than one display, keypad and/or selection buttons and the user interface 108 may be positioned at any surface of the device that is visible to the user.

Figure 2:
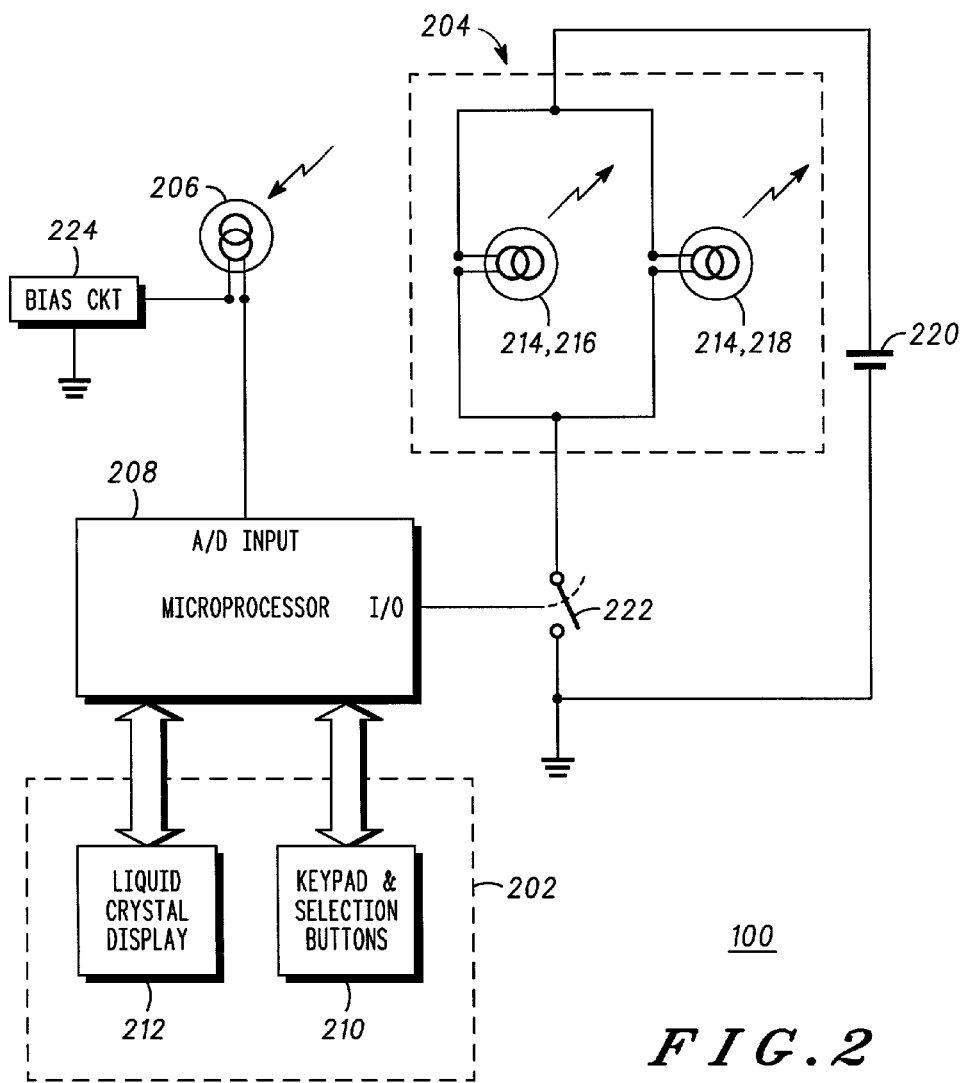
FIG. 2 is a block diagram of the internal components of the radiotelephone of FIG. 1.

Referring to FIG. 2, there is provided a block diagram of the preferred embodiment of the present invention. The internal components of the preferred embodiment include a user interface 202, a lighting circuit 204, a light sensor 206 and a control circuit 208. The user interface 202 may be any type of input device 210, output device 212 or combination input/output device that interacts with the user during the operation of the portable electronic device 100. For example, as shown in FIG. 1, the user interface 202 includes the display 110, the keypad 112, and the selection buttons 114.

The light sensor 206 determines ambient lighting conditions about the user interface 202 and generates an ambient lighting signal based on the ambient lighting conditions. For the preferred embodiment, the light sensor 206 is a photocell. The positioning of the light sensor 206 relative to the user interface 202 is important in determining the ambient lighting conditions. In particular, the light sensor 206 must be directed toward the area in front of the user interface 202 that affects the visibility of the user interface and sufficiently capture the ambient lighting conditions. For example, the light sensor 206 may be positioned on the front surface of a portable electronic device 100 on, or adjacent to, the display or the keypad. In the alternative, the light sensor may be implanted into the display 212 or keypad 210 and directed toward the front surface to measure the ambient lighting conditions. The light sensor 206 may be mounted within a light guide (not shown) of the backlighting system or coupled to a light guide (not shown) from the front of the portable electronic device. In addition, more than one light sensor may be used in cooperation to improve the precision of the ambient lighting signal in case the operation of one light sensor may be hindered by an obstruction, such as a user's finger. Additional light sensors may also be positioned throughout the outer surface of the device 100 to determine the general ambient lighting conditions surrounding the device. Further, the light sensor 206 should be positioned in such a way that it is not falsely exposed or tripped by the backlighting circuit 204, and the lighting levels of the light sensor must be preset to compensate for any extra illumination detected from the backlighting circuit.

The control circuit 208, which is coupled to the lighting circuit 204, has a delayed operation mode under certain lighting conditions, particularly when the ambient lighting conditions are inadequate for viewing the user interface 202 by the user. For the preferred embodiment, the control circuit 208 is a processor having a memory portion and an analog-to-digital input for receiving signals from an analog device such as, for example, the light sensor 206. The control circuit 208 may also be a digital signal processor or integrated within a driving circuit of the user interface 202 or a portion thereof. The control circuit 208 determines whether the ambient lighting signal generated by the light sensor 206 is below a minimum illumination level. The minimum illumination level should correspond to a detection of total darkness or brighter to activate the delayed operation mode but correspond to a detection substantially dimmer that total brightness to minimize unnecessary battery consumption of the device 100. Preferably, the minimum illumination level corresponds to the minimum amount of lighting needed by the user to comfortably view the user interface 202. The minimum illumination level may be predetermined or set by the user, and it may vary for each portion of the user interface 202, e.g. different minimum illumination levels for the display 212 and the input device 210.

In the delayed operation mode, the control circuit 208 detects a first activation of the user interface 202 and illuminates the user interface without performing any other operation of the device 100. The control circuit 208 then detects a second activation of the user interface 202 and performs an operation of the device 100 other than illuminating the user interface. For the preferred embodiment, the control circuit 208 illuminates the display 212, the keypad 202 and the selection buttons when the user selects a particular key of the keypad. For example, if a numeric key is selected such as the number "1", then the display 212, keypad 210 and selection buttons are illuminated but the number "1" does not appear on the display. If the user selects the same key or another key of the keypad 210 thereafter, then the appropriate operation of that selected key is performed. Continuing with the example above, if the number "1" is selected again, then the number "1" will appear on the illuminated display 212 (assuming that displaying the alphanumeric characters is a normal operation of the device 100 when that particular button is selected). Also, for the preferred embodiment, a key selection qualifies as a second selection if the display 212, keypad and/or selection buttons 210 are still illuminated when the button selection occurs.

The lighting circuit 204 includes a light source 214 to illuminate one or more portions of the user interface 202. Examples of the light source 204 include a light emitting diode ("LED") that irradiates the user interface 202 from the back or from the side. As shown in FIG. 2, the lighting circuit 204 of the preferred embodiment includes a light source 216 for the illuminating the display 212 and another light source 218 for illuminating the input device 210. However, it is to be understood that a single light source may be used to illuminate more that one portion of the user interface 202 and the intensity or duration of illumination for each portion may be varied. Also shown in FIG. 2, there is provided a power source 220, such as a battery, and a switch 222 connected in series with the lighting circuit 204. The switch 222 is controlled by the control circuit 208 to supply and cut power from the power source 220 to the lighting circuit 204.

The light source 214 of the lighting circuit 204 may also serve as an economical light sensor by using reverse bias generated by the light source when incident with light. Additional circuitry may be added to the light source for the required sensitivity levels. For example, for the preferred embodiment shown in FIG. 2, the light sensor 206 and the light source 214 are one-and-the-same, namely a light emitting diode ("LED"). A bias circuit 224 is coupled to the LED to determine the ambient lighting conditions via the reverse bias generated by the LED. This bias is sufficient to distinguish between total darkness and the availability of sufficient ambient light to view the user interface 202.

Additionally, the same panel of LED's used to light the user interface 202 may also be fed into the control circuit 208 with an additional load resistor. In this case, the collective reverse bias generated by all the LED's is sufficient to distinguish between total darkness and sufficient ambient light to view the user interface 202.

Figure 3:
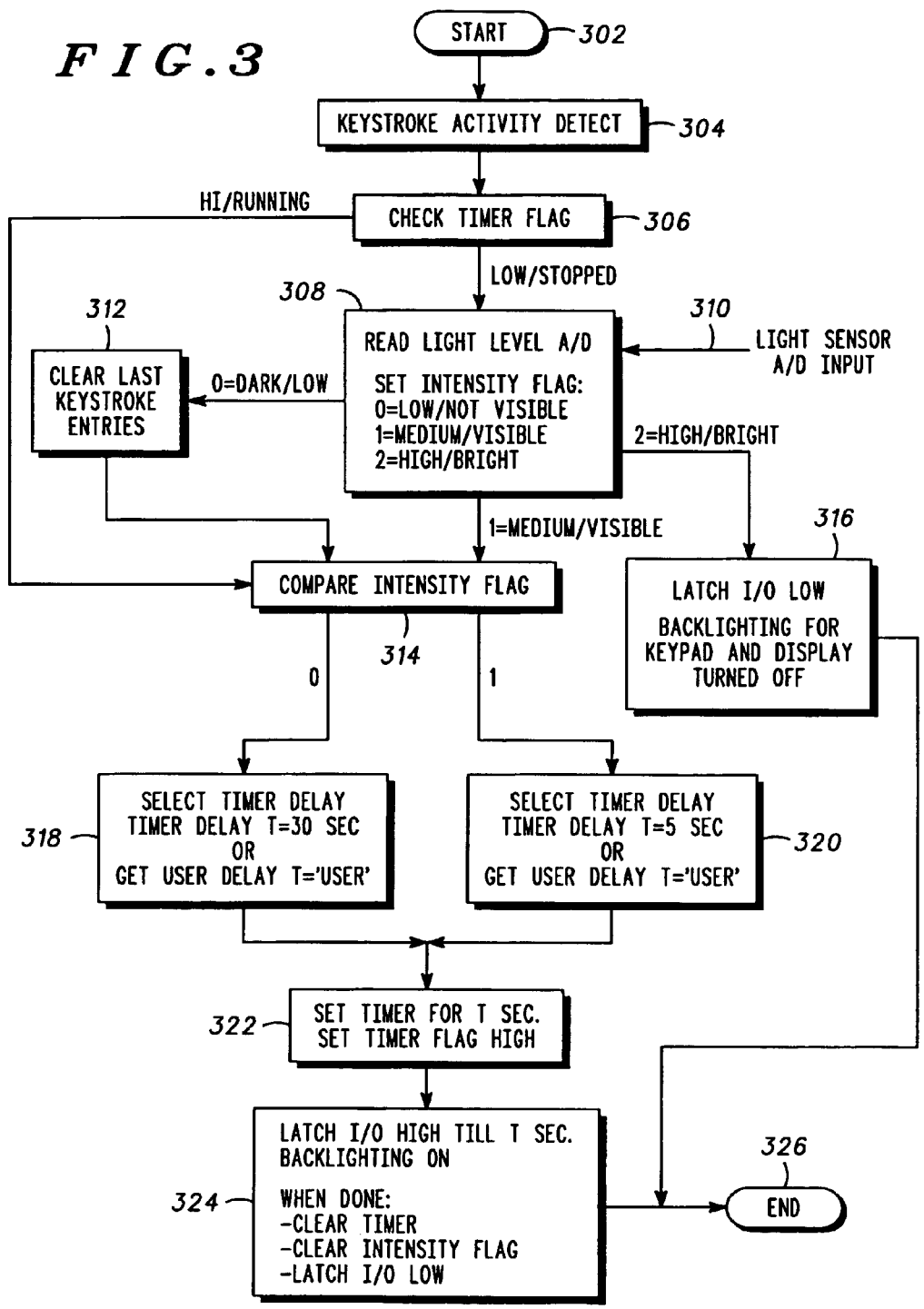
FIG. 3 is a flow diagram of the operation of the internal components of FIG. 2.

Referring to FIG. 3 (with reference to the components of FIG. 2), there is provided a flow diagram of the operation of the preferred embodiment which starts with step 302. For the preferred embodiment, step 304 of the flow diagram is executed whenever the control circuit 208 detects a keystroke at the input device 210. The control circuit 208 then checks a timer flag to determine whether a timer is still running from a previous operation or is no longer running in step 306. When the control circuit 208 initially detects a keystroke in step 304, the timer flag will indicate that the timer has not yet started in step 306.

The control circuit 208 next receives the ambient lighting signal from the light sensor 206 as shown by input 310, and classifies the intensity of the ambient lighting signal in step 308. The lighting circuit 204 illuminates the user interface 202 for a particular duration when the ambient lighting signal is at a low level and the lighting circuit illuminates the user interface for a shorter duration when the ambient lighting signal is greater than the low level. For example, the lighting circuit 202 may illuminate the user interface 202 for a minimum duration when the ambient lighting signal is at or above a maximum threshold level, for a maximum duration when the ambient lighting signal is below a minimum threshold level, and for an intermediate duration when the ambient lighting signal is below the maximum threshold level and at or above the minimum threshold level. In step 308, the control circuit 208 of the preferred embodiment classifies the ambient lighting signal in one of three categories: low level lighting in which the user interface is not visible by the user, medium level lighting in which the user interface is sufficiently visible by the user, and high level lighting in which the user interface is clearly visible by the user. Also, in step 308, an intensity flag is set by the control circuit record the determined category. For the preferred embodiment, the intensity flag is set to "0" for low level lighting, "1" for medium level lighting, and "2" for high level lighting.

For low level lighting when the timer is not running, the ambient lighting signal is below the minimum threshold value. Thus, the control circuit 208 clears or ignores the last keystroke entry of the user interface 202. During this step, the control circuit 208 illuminates the user interface 202 in response to an activation of the user interface without performing any other operation of the device 100 in step 312. The intensity flag set in step 308 is then compared in step 314. For medium level lighting when the timer is not running, the ambient lighting signal is at or above the minimum threshold value and below the maximum threshold value. Thus, the intensity flag is compared in step 314 directly from step 308. For high level lighting when the timer is not running, the ambient lighting signal is at or above the maximum threshold level. Therefore, the lighting circuit 204 illuminates the user interface 202 for a minimum duration. For example, as shown in step 316, the user interface 202 is not illuminated at all. For any level lighting when the timer is running, the classification of ambient lighting signal is bypassed so the control circuit proceeds directly from step 306 to step 314. For example, for low level lighting when the timer is running, the control circuit 208 bypasses steps 308 and 312, and performs the operation of the last keystroke entry. During this step, the control circuit 208 performs the operation in response to an activation of the user interface 202 other than illuminating the user interface.

For low level lighting, the lighting circuit 204 illuminates the user interface 202 for a maximum duration or time delay T set in step 318. As show by step 318, the maximum duration may be a predetermined time period, such as 30 seconds, or determined by the user. Similarly, for medium level lighting, the lighting circuit 204 illuminates the user interface 202 for an intermediate duration or timer delay T, set in step 320, that is longer than the minimum duration and shorter than the maximum duration. As shown by step 320, the intermediate duration may be a predetermined time period, such as 5 seconds, or determined by the user. Although not shown in FIG. 3, for high level lighting, the minimum duration or timer delay T may be a predetermined time period, such as 0 seconds, or determined by the user.

Thereafter, in step 322, the timer is set to correspond to the time delay T determined in steps 318 or 320. Also, step 322, the timer flag is set high for the next time it will be checked at step 306. Then, in step 324, a latch I/O is set high and, thus, the lighting circuit 204 is active until the duration or timer delay T set in step 322 expires. Switch 222 shown in FIG. 2 is an example of the latch I/O that activates and de-activates the lighting circuit 204. Also, in step 324, if the duration or timer delay T expires before it is reset, then the timer is cleared, the intensity flag is cleared and the latch I/O is set low. If a keystroke is entered before the expiration of the timer, the ambient lighting signal is not classified again. Instead, the timer is reset to the previous duration or timer delay T based on the previously detected ambient lighting conditions. Accordingly, any effects to the light sensor 206 by the lighting circuit 204 are minimized. Finally, the control circuit 208 terminates the above procedure at step 326.

In an environment having insufficient ambient lighting (such as total darkness), the present invention permits the user to apply an initial keystroke to activate the backlighting system or lighting circuit 204 so that the user may view the user interface 202. The operational data corresponding to this initial keystroke is ignored or cleared. Thereafter, each subsequent keystroke made soon after the previous keystroke creates a valid entry of the corresponding operational data. There are many situations where the user may try to use the portable electronic device 100 in low level lighting such as in a dark hallway or in a car when traveling at night. Since the user interface 202 is not visible in such situations, the user may apply a keystroke to the input device 210 to illuminate the user interface. The lighting circuit 204 illuminates the user interface 202 for a fixed duration or use selectable length of time.

In an environment having sufficient ambient lighting, the backlighting system or lighting circuit 204 becomes a wasteful drain on the power source 220 of the device 100, and the user does not have a functional need to illuminate the user interface. The present invention adds intelligent circuitry to the device 100 to turn-on the backlighting system or lighting circuit 204 for variable time periods depending on the ambient lighting conditions. A significant drain on the power source 220 can be alleviated, thus, extending the energy life of the device 100 between charges. For example, when the device 100 is operated in a well-lit hallway or room, the user interface is sufficiently viewable. The lighting circuit 204 illuminates the user interface for a fixed duration or user selectable length of time. When the device 100 is operated in conditions of bright ambient light, such as outdoor daylight, the lighting circuit 204 illuminates the user interface 202 for a minimal duration or is not activated at all.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A portable electronic device comprising:
   a user interface;
   a light sensor configured to determine ambient lighting conditions about the user interface and generate an ambient lighting signal based on the ambient lighting conditions;
   a lighting circuit including a light source to illuminate the user interface; and
   a control circuit coupled to the lighting circuit, the control circuit having a delayed operation mode wherein:
   a first activation of the user interface clears or ignores a user entry so that it is not acknowledged by the user interface, illuminates the user interface, and activates a timer, the lighting circuit illuminating the user interface for variable time periods depending on the ambient lighting signal; and
   a second activation of the user interface performs an operation of the device, acknowledged by the user interface, in response to determining that the timer is still activated.

2. The portable electronic device of claim 1, wherein the delayed operation mode is effective when the control circuit determines that the ambient lighting signal is below a minimum illumination level.

3. The portable electronic device of claim 1, wherein the lighting circuit illuminates the user interface for a particular duration when the ambient lighting signal is at a low level and the lighting circuit illuminates the user interface for a shorter duration when the ambient lighting signal is greater than the low level.

4. The portable electronic device of claim 1, wherein the control circuit receives a reverse bias signal generated by the lighting circuit when incident with ambient lighting about the user interface and activating the lighting circuit to illuminate the user interface based on the ambient lighting.

5. The portable electronic device of claim 4, wherein the delayed operation mode is effective when the control circuit determines that the ambient lighting is below a minimum illumination level.

6. The portable electronic device of claim 4, wherein the lighting circuit illuminates the user interface for a particular duration when the ambient lighting is at a low level and the lighting circuit illuminates the user interface for a shorter duration when the ambient lighting is greater than the low level.

7. The portable electronic device of claim 4, wherein:
   the lighting circuit illuminates the user interface for a minimum duration when the ambient lighting is at or above a maximum threshold level;
   the lighting circuit illuminates the user interface for a maximum duration when the ambient lighting is below a minimum threshold level; and
   the lighting circuit illuminates the user interface for an intermediate duration when the ambient lighting is below the maximum threshold level and at or above the minimum threshold level.

8. A method of illuminating a user interface of a portable electronic device, the method comprising the steps of:
   determining ambient lighting conditions about the user interface;
   generating an ambient lighting signal based on the ambient lighting conditions; and
   detecting a first activation of the user interface;
   clearing or ignoring a user entry so that it is not acknowledged by the user interface, illuminating the user interface for variable time periods depending on the ambient lighting signal, and activating a timer in response to detecting the first activation;
   detecting a second activation of the user interface;
   determining whether the time is still activated in response to detecting the second activation of the user interface; and
   performing an operation of the device, acknowledged by the user interface, in response to determining that the timer is still activated.

9. The method of claim 8, wherein:
   the stop of detecting a first activation includes the step of detecting a first activation of the input device;
   the step of illuminating includes the step of illuminating the display in response to detecting the first activation without performing any other operation of the device;
   the step of detecting a second activation includes the step of detecting a second activation of the input device; and
   the step of performing includes the step of performing an operation of the device other than illuminating the display.

10. The method of claim 8 further comprising, before the step of detecting the first activation, the step of determining that the ambient lighting conditions are below a minimum illumination level.

11. The method of claim 8, wherein the step of illuminating includes the steps of illuminating the user interface for a particular duration when the ambient lighting conditions are at a low level and illuminating the user interface for a shorter duration when the ambient lighting conditions are greater than the low level.

12. The method of claim 8, wherein the step of illuminating includes the steps of:
   illuminating the user interface for a minimum duration when the ambient lighting conditions are at or above a maximum threshold level;
   illuminating the user interface for a maximum duration when the ambient lighting conditions are below a minimum threshold level; and
   illuminating the user interface for an intermediate duration when the ambient lighting conditions are below the maximum threshold level and at or above the minimum threshold level.

* * * * *